United States Patent [19]

Fauran et al.

[11] 3,876,636
[45] Apr. 8, 1975

[54] PYRIMIDIN-6 YL ACETHYDROXAMIC ACIDS

[75] Inventors: Claude P. Fauran, Paris; Guy R. Bourgery, Colombes; Jeannine A. Eberle, Chatou; Guy M. Raynaud, Paris; Claude J. Gouret, Meudon, all of France

[73] Assignee: Delalande S.A., Courbevoie (Hauts de Seine), France

[22] Filed: Oct. 24, 1972

[21] Appl. No.: 299,672

[30] Foreign Application Priority Data
Oct. 28, 1971 France .............................. 71.38788

[52] U.S. Cl.... 260/247.2 A; 260/256.4 N; 424/248; 424/251
[51] Int. Cl............................................. C07d 51/42
[58] Field of Search............... 260/247.2 A, 256.4 N

[56] References Cited
FOREIGN PATENTS OR APPLICATIONS
1,526,533    5/1968    France.......................... 260/256.4 N
38-13878    6/1963    Japan............................ 260/256.4 N OTHER PUBLICATIONS
Smith, P. A. S., "Open–Chain Nitrogen Compounds," Vol II, W. A. Benjamin, Inc. N.Y. 1966, pg. 95.

*Primary Examiner*—Lorraine A. Weinberger
*Assistant Examiner*—Paul J. Killos
*Attorney, Agent, or Firm*—Woodhams, Blanchard and Flynn

[57] ABSTRACT
Compounds of the formula

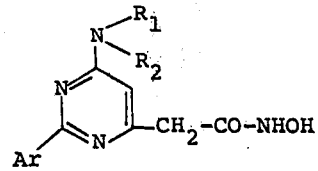

wherein $R_1$ and $R_2$ are alkyls having from 1 to 3 carbon atoms, or

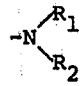

is morpholino, pyrrolidino, piperidino and hexamethyleneimino, and
Ar is phenyl, phenyl mono- or polysubstituted with halogen, methoxy or methylcarbonyloxy, 3,4-methylenedioxy phenyl, or 3-trifluoromethyl phenyl are prepared by reacting the corresponding 4-chloro-6-ethyl acetate compound with

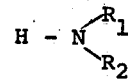

to obtain the 4-amino-6-ethyl acetate compound and then reacting the latter compound with hydroxylamine hydrochloride. The compounds possess analgesic and antiinflammatory properties.

8 Claims, No Drawings

PYRIMIDIN-6 YL ACETHYDROXAMIC ACIDS

The present invention relates to pyrimidin-6 yl acethydroxamic acids, their method of preparation and their therapeutic application.

The compounds according to the invention correspond to the formula

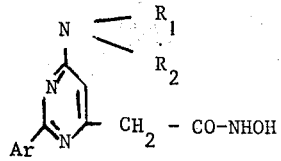

in which:

R$_1$ and R$_2$ each represent an alkyl radical containing from 1 to 3 carbon atoms, or together with the nitrogen atom to which they are attached form a heterocyclic radical selected from morpholino, pyrrolidino, piperidino and hexamethyleneimino; and Ar, represents:

a phenyl radical which may be mono- or polysubstituted by a halogen atom from fluoro, chloro and bromo, by a methoxy or a methylcarbonyloxy radical, a 3,4-methylenedioxy phenyl radical, or a 3-trifluoromethyl phenyl radical.

The method of preparation according to the invention consists in reacting an acetic ester of formula:

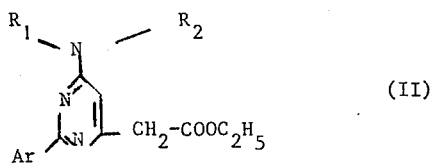

wherein R$_1$ and R$_2$ and Ar have the same significance as in formula (I), with hydroxylamine hydrochloride.

The reaction is effected in a methanolic medium, at the reflux temperature of methanol, and in the presence of sodium methanolate. the reaction product is recovered by filtration in a neutral sodium, followed by recrystallisation from a solvent selected from alcohol, acetone, a dimethylformamide/alcohol mixture and a dimethylformamide/acetone mixture.

The acetic esters of formula (II) are obtained by condensation in a benzenic medium of a derivative, suitably substituted in the 2-position, of (4-chloropyrimidin-6 yl) ethyl acetate of formula:

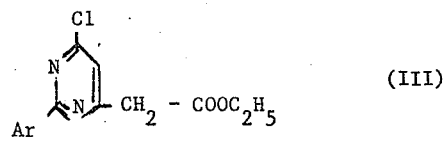

in which:

—Ar has the same signification as in formula (I) with an amine of formula

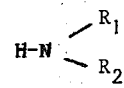

in which R$_1$ and R$_2$ also have the same signification as in formula (I)

The preparation of [(2-parachlorophenyl 4-pyrrolidino)-pyrimidin-6 yl] acethydroxamic acid, of code No. 71,224, is given by way of example to illustrate the present invention.

0.1 mole of hydroxylamine hydrochloride in solution in 125 c.c. of methanol is added to a solution of 0.2 mole of sodium methanolate in 200 c.c. of methanol. The sodium chloride formed is filtered off. Over a period of 10 minutes, 0.1 mole of the ethyl ester of [(2-p-chlorophenyl 4-pyrrolidino)-pyrimidin-6 yl] acetic acid is added to the filtrate, with agitation. The reaction mixture is left with agitation at ambient temperature until dissolution in the filtrate of said ethyl ester is just complete, and then the agitation is continued at the reflux temperature of methanol for one hour.

After cooling, the reaction mixture is slightly acidified and then neutralised by the addition of sodium bicarbonate.

The product obtained is filtered and recrystallised from 96° alcohol.

| | | |
|---|---|---|
| Melting point | = | 218°C |
| Yield | = | 51 % |
| Empirical formula | = | C$_{16}$H$_{17}$Cl N$_4$ O$_2$ |
| Elementary analysis: | C | H | N |
| Calculated % | 57.74 | 5.15 | 16.84 |
| Found % | 57.64 | 4.95 | 16.91 |

The compounds listed in Tables I, I$a$, I$b$ and I$c$ are prepared by the method according to the preceding example, whilst Tables I$d$ and I$e$ indicate the identification characteristics of synthesised intermediates of formula (II), which intermediates are novel.

TABLE I

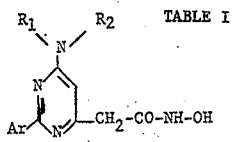

| Code No | Ar | N(R$_1$)(R$_2$) | Empirical Formula | Molecular weight | Melting point (°C) | Yield | Elementary analysis Calculated | | | Found | | |
|---|---|---|---|---|---|---|---|---|---|---|---|---|
| | | | | | | | C(%) | H(%) | N(%) | C(%) | H(%) | N(%) |
| 7101 | p.Cl-C$_6$H$_4$ | piperidino | C$_{17}$H$_{19}$Cl N$_4$O$_2$ | 346,81 | 209°C | 58% | 58,87 | 5,52 | 16,16 | 58,71 | 5,27 | 16,37 |
| 71148 | p.Cl-C$_6$H$_4$ | N(C$_3$H$_7$n)(C$_3$H$_7$n) | C$_{18}$H$_{23}$Cl N$_4$O$_2$ | 362,85 | 140°C | 48% | 59,58 | 6,39 | 15,44 | 59,64 | 6,37 | 15,64 |
| 71165 | p.Cl-C$_6$H$_4$ | hexamethyleneimino | C$_{18}$H$_{21}$Cl N$_4$O$_2$ | 360,84 | 179°C | 52% | 59,91 | 5,87 | 15,53 | 59,94 | 5,82 | 15,71 |

Table I—Continued

| Code No. | Ar | -N<R₁/R₂ | Empirical Formula | Molecular weight | Melting point (°C) | Yield (%) | Elementary analysis Calculated C(%) | H(%) | N(%) | Found C(%) | H(%) | N(%) |
|---|---|---|---|---|---|---|---|---|---|---|---|---|
| 71197 | p.Cl-C₆H₄ | morpholino | C₁₆H₁₇Cl N₄O₃ | 348,78 | 206°C | 36% | 55,09 | 4,91 | 16,06 | 55,25 | 5,02 | 15,91 |
| 71460 | p.Cl-C₆H₄ | -N(CH₃)(CH₃) | C₁₄H₁₅Cl N₄O₂ | 306,75 | 181°C | 51% | 54,81 | 4,93 | 18,27 | 54,72 | 4,90 | 18,31 |

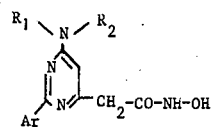

TABLE I a

| Code No | Ar | -N<R₁/R₂ | Empirical Formula | Molecular weight | Melting point (°C) | Yield (%) | Elementary analysis Calculated C(%) | H(%) | N(%) | Found C(%) | H(%) | N(%) |
|---|---|---|---|---|---|---|---|---|---|---|---|---|
| 7248 | 3,4,5 (CH₃O)₃-C₆H₂ | pyrrolidino | C₁₉H₂₄N₄O₅ | 388,41 | 175°C | 46% | 58,75 | 6,23 | 14,43 | 58,71 | 6,51 | 14,24 |
| 71437 | 3,4,5 (CH₃O)₃-C₆H₂ | morpholino, H₂O | C₁₉H₂₆N₄O₇ | 419,40 | 120°C | 68% | 54,02 | 6,20 | 13,26 | 53,82 | 6,21 | 13,08 |
| 72150 | 3,4,5 (CH₃O)₃-C₆H₂ | piperidino | C₂₀H₂₆N₄O₅ | 402,44 | 155°C | 62% | 59,69 | 6,51 | 13,92 | 59,85 | 6,72 | 13,98 |
| 72160 | 3,4,5 (CH₃O)₃-C₆H₂ | hexamethyleneimino | C₂₁H₂₈N₄O₅ | 416,47 | 174°C | 47% | 60,56 | 6,78 | 13,45 | 60,72 | 6,88 | 13,34 |
| 72155 | m.CF₃-C₆H₄- | pyrrolidino | C₁₇H₁₇F₃N₄O₂ | 366,34 | 195°C | 46% | 55,73 | 4,68 | 15,30 | 55,66 | 4,90 | 15,44 |
| 72172 | m.CF₃-C₆H₄- | morpholino | C₁₇H₁₇F₃N₄O₃ | 382,34 | 211°C | 49% | 53,40 | 4,48 | 14,66 | 53,59 | 4,58 | 14,59 |
| 72395 | m.Cl-C₆H₄- | -N(C₂H₅)(C₂H₅) | C₁₆H₁₉ClN₄O₂ | 334,80 | 188°C | 64% | 57,40 | 5,72 | 16,74 | 57,53 | 5,71 | 16,94 |

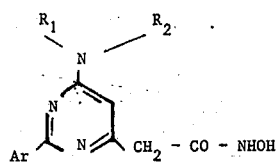

TABLE Ib

| Code No | Ar | N<R₁/R₂ | Empirical formula | molecular weight | Melting point (°C) | Yield (%) | Elementary analysis Calculated C(%) | H(%) | N(%) | Found C(%) | H(%) | N(%) |
|---|---|---|---|---|---|---|---|---|---|---|---|---|
| 72541 | m.Cl-C₆H₄ | -N(CH₃)(CH₃) | C₁₅H₁₅ClN₄O₂ | 306.75 | 204 | 37.5 | 54.81 | 4.93 | 18.27 | 54.61 | 4.95 | 18.10 |
| 72554 | m.Cl-C₆H₄ | piperidino | C₁₇H₁₉ClN₄O₂ | 346.81 | 191 | 26 | 58.87 | 5.53 | 16.16 | 58.85 | 5.65 | 16.06 |
| 72576 | m.Cl-C₆H₄ | pyrrolidino | C₁₆H₁₇ClN₄O₂ | 332.78 | 217 | 17 | 57.74 | 5.15 | 16.84 | 57.86 | 5.31 | 16.81 |
| 72591 | m.Cl-C₆H₄ | morpholino | C₁₆H₁₇ClN₄O₃ | 348.78 | 175 | 27 | 55.09 | 4.91 | 16.06 | 54.97 | 4.82 | 15.92 |
| 72585 | m.CF₃-C₆H₄ | -N(C₂H₅)(C₂H₅) | C₁₇H₁₉F₃N₄O₂ | 368.35 | 184 | 35 | 55.43 | 5.20 | 15.21 | 55.26 | 5.23 | 15.02 |
| 72592 | m.CF₃-C₆H₄ | -N(CH₃)(CH₃) | C₁₅H₁₅F₃N₄O₂ | 340.30 | 205 | 28 | 52.94 | 4.44 | 16.47 | 53.04 | 4.46 | 16.35 |
| 72651 | m.CF₃-C₆H₄ | hexamethyleneimino | C₁₉H₂₁F₃N₄O₂ | 394.39 | 152 | 54 | 57.86 | 5.37 | 14.21 | 57.77 | 5.30 | 14.34 |

TABLE Ic

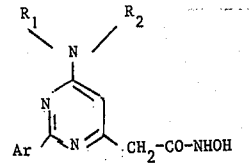

| Code No | Ar | -N⟨R₁/R₂ | Empirical Formula | Molecular weight | Melting point (°C) | Yield (%) | Elementary analysis Calculated | | | Found | | |
|---|---|---|---|---|---|---|---|---|---|---|---|---|
| | | | | | | | C(%) | H(%) | N(%) | C(%) | H(%) | N(%) |
| 72660 | $m.CF_3$-$C_6H_4$ | -N(piperidine) | $C_{18}H_{19}F_3N_4O_2$ | 380.37 | 162 | 55 | 56.84 | 5.04 | 14.79 | 56.65 | 5.12 | 14.80 |
| 72616 | $m.F$-$C_6H_4$ | -N(pyrrolidine) | $C_{16}H_{17}FN_4O_2$ | 316.39 | 200 | 32.5 | 60.75 | 5.42 | 17.71 | 60.79 | 5.49 | 17.78 |
| 72662 | $m.F$-$C_6H_4$ | -N(morpholine) | $C_{17}H_{17}FN_4O_3$ | 332.33 | 199 | 29 | 57.82 | 5.16 | 16.86 | 58.02 | 5.36 | 16.72 |

TABLE I d

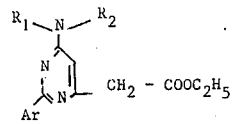

| Code No | Ar | -N⟨R₁/R₂ | Empirical Formula | Molecular weight | Melting point (°C) | Yield (%) | Elementary analysis Calculated | | | Found | | |
|---|---|---|---|---|---|---|---|---|---|---|---|---|
| | | | | | | | C(%) | H(%) | N(%) | C(%) | H(%) | N(%) |
| 71565 | 3,4,5 $(CH_3O)_3$-$C_6H_2$- | -N(pyrrolidine) | $C_{21}H_{27}N_3O_5$ | 401,45 | 137°C | 72% | 62,82 | 6,78 | 10,47 | 62,61 | 6,73 | 10,54 |
| 71306 | 3,4,5 $(CH_3O)_3$-$C_6H_2$- | -N(morpholine) | $C_{21}H_{27}N_3O_6$ | 417,45 | 109°C | 70% | 60,42 | 6,52 | 10,07 | 60,38 | 6,35 | 10,00 |
| 72127 | 3,4,5 $(CH_3O)_3$-$C_6H_2$- | -N(piperidine) | $C_{22}H_{29}N_3O_5$ | 415,48 | 78°C | 62% | 63,59 | 7,04 | 10,11 | 63,52 | 7,25 | 10,31 |
| 72164 | 3,4,5 $(CH_3O)_3$-$C_6H_2$- | -N(hexamethyleneimine) | $C_{23}H_{31}N_3O_5$ | 429,90 | 50°C | 50% | 64,31 | 7,28 | 9,78 | 64,33 | 7,33 | 9,84 |
| 72147 | $m.CF_3$-$C_6H_4$ - | -N(pyrrolidine) | $C_{19}H_{20}F_3N_3O_2$ | 379,37 | 125°C | 28% | 60,15 | 5,31 | 11,08 | 60,24 | 5,50 | 11,15 |
| 72154 | $m.CF_3$-$C_6H_4$ - | -N(morpholine) | $C_{19}H_{20}F_3N_3O_3$ | 395,37 | 128°C | 57% | 57,71 | 5,10 | 10,63 | 57,53 | 5,15 | 10,54 |
| 72427 | $m.Cl.C_6H_4$ - | -N($C_2H_5$)($C_2H_5$) | $C_{18}H_{22}ClN_3O_2$ | 347,84 | 73°C | 73% | 62,15 | 6,38 | 12,08 | 61,99 | 6,18 | 12,01 |

TABLE I e

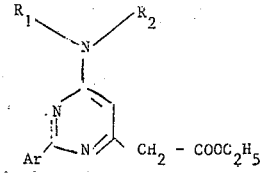

| Code No | Ar | -N⟨R₁/R₂ | Empirical Formula | Molecular weight | Melting point (°C) | Yield (%) | Elementary analysis Calculated | | | Found | | |
|---|---|---|---|---|---|---|---|---|---|---|---|---|
| | | | | | | | C(%) | H(%) | N(%) | C(%) | H(%) | N(%) |
| 72107 | $m.Cl$-$C_6H_4$ | -N(pyrrolidine) | $C_{18}H_{20}ClN_3O_2$ | 345,82 | 99 | 65 | 62,51 | 5,83 | 12,15 | 62,55 | 5,92 | 11,95 |
| 72396 | $m.Cl$-$C_6H_4$ | -N(morpholine) | $C_{18}H_{20}ClN_3O_3$ | 361,82 | 82 | 36 | 59,75 | 5,57 | 11,61 | 59,55 | 5,45 | 11,62 |
| 72405 | $m.Cl$-$C_6H_4$ | -N($CH_3$)($CH_3$) | $C_{16}H_{18}ClN_3O_2$ | 319,78 | 79 | 36.5 | 60,09 | 5,67 | 13,14 | 60,29 | 5,56 | 12,99 |
| 72565 | $m.CF_3$-$C_6H_4$ | -N($C_2H_5$)($C_2H_5$) | $C_{19}H_{22}F_3N_3O_2$ | 381,39 | 88 | 71 | 59,83 | 5,81 | 11,02 | 59,96 | 5,93 | 10,92 |

TABLE Ie—Continued

| Code No | Ar | N<R1/R2 | Empirical Formula | Molecular weight | Melting point (°C) | Yield | Elementary analysis | | | | | |
|---|---|---|---|---|---|---|---|---|---|---|---|---|
| | | | | | | | Calculated | | | Found | | |
| | | | | | | | C(%) | H(%) | N(%) | C(%) | H(%) | N(%) |
| 72584 | m.CF$_3$-C$_6$H$_4$ | -N(CH$_3$)(CH$_3$) | C$_{17}$H$_{18}$F$_3$N$_3$O$_2$ | 353.39 | 82 | 69.5 | 57.78 | 5.14 | 11.89 | 57.58 | 4.99 | 11.65 |
| 72600 | m.F-C$_6$H$_4$ | -N(hexamethyleneimino) | C$_{18}$H$_{20}$FN$_3$O$_3$ | 345.36 | 93 | 60 | 62.59 | 5.84 | 12.17 | 62.78 | 5.85 | 12.06 |
| 72612 | m.F-C$_6$H$_4$ | -N(piperidino) | C$_{18}$H$_{20}$FN$_3$O$_2$ | 329.36 | 85 | 57 | 65.64 | 6.12 | 12.76 | 65.49 | 5.93 | 12.96 |

The compounds of formula (I) have been tested on animals in the laboratory and have been shown to possess analgesic and antiinflammatory properties.

1. Analgesic properties

The compounds of formula (I), administered orally to a mouse, are capable of reducing the number of painful stretchings caused by the intraperitoneal injection of acetic acid.

By way of examples, the results obtained with various compounds of formula (I) are given in Table II.

TABLE II

| Code No | Dose administered (mg/kg/PO) | Percentage of reduction of the number of painful stretchings |
|---|---|---|
| 71148 | 50 | 65 % |
| 7101 | 100 | 70 % |
| 71165 | 100 | 65 % |
| 71224 | 40 | 50 % |

2. Antiinflammatory properties

These properties show themselves by a diminution of the local oedema, caused by the sub-planar injection of a phlogogenic agent, such as carragenin, in a rat followed by the oral administration of the compounds of formula (I).

By way of examples, the results obtained with various compounds of formula (I) are given in Table III.

TABLE III

| Code No | Dose Administered (mg/kg/PO) | Percentage diminution of the oedema |
|---|---|---|
| 71148 | 100 | 70 % |
| 71165 | 100 | 50 % |
| 71224 | 30 | 50 % |

The compounds of formula (I) tested, showed a weak toxicity, since no mortality in the mouse was produced by an administered dose of 2g/kg/PO. Accordingly, the difference between the lethal dose and the pharmacologically-active dose, mentioned in the preceding examples, is sufficiently great to permit the compounds of formula (I) to be utilised in therapeutics.

The compounds of formula (I) are suitable for use in the treatment of inflammatory and other pains. They may be administered by oral means in the form of tablets, sugar-coated, pills or gelules containing 25 to 500 mg. of active ingredient (1 to 5 times a day) and by rectal means in the form of suppositories containing 25 to 250 mg of active ingredient (1 to 2 times a day).

Accordingly, the present invention also relates to a therapeutic composition comprising a compound of the general formula (I), together with a therapeutically-acceptable carrier.

What we claim is:

1. A compound having the formula:

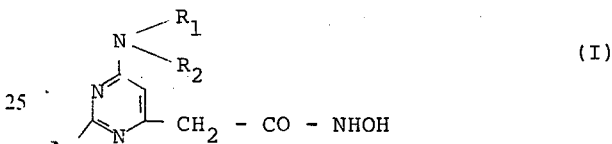
(I)

in which:

R$_1$ and R$_2$ each is alkyl containing 1 to 3 carbon atoms, or

is selected from the group consisting of morpholino, pyrrolidino, piperidino and hexamethyleneimino, and Ar is phenyl, or phenyl mono- or polysubstituted by fluoro, chloro or bromo, or by methylcarbonyloxy, or by methoxy, or a 3,4-methylenedioxy phenyl or a 3-trifluoromethyl phenyl.

2. A compound as claimed in claim 1, in which Ar is p-chloro-phenyl, m-chlorophenyl or m-fluorophenyl.

3. A compounds as claimed in claim 1, in which Ar is 3,4,5-trimethoxy phenyl.

4. A compound as claimed in claim 1, in which Ar is 3-trifluoromethyl phenyl.

5. A compound as claimed in claim 1, in which R$_1$ and R$_2$ are indentical alkyls.

6. A compound as claimed in claim 1, in which R$_1$ and R$_2$ each represent methyl, ethyl or n-propyl.

7. A compound as claimed in claim 1, in which

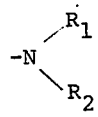

is selected from the group consisting of pyrrolidino, piperidino and hexamethyleneimino.

8. A compound as claimed in claim 1, in which

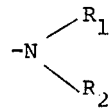

is morpholino.

* * * * *